United States Patent [19]

Lössel et al.

[11] Patent Number: 4,465,955
[45] Date of Patent: Aug. 14, 1984

[54] DC SHUNT TRACTION MOTOR DRIVE SUPPLIED FROM AN ENERGY ACCUMULATOR

[75] Inventors: Walter Lössel, Zirndorf; Klaus Schmidhuber, Rottenbach, both of Fed. Rep. of Germany

[73] Assignee: Siemens Aktiengesellschaft, Munich, Fed. Rep. of Germany

[21] Appl. No.: 452,776

[22] Filed: Dec. 23, 1982

[30] Foreign Application Priority Data

Jan. 11, 1982 [DE] Fed. Rep. of Germany ....... 3200510

[51] Int. Cl.³ .......................... H02P 7/06; H02P 5/16
[52] U.S. Cl. .................................... 318/139; 318/375; 318/378; 318/350; 318/341; 318/661
[58] Field of Search ............... 318/139, 341, 314, 269, 318/369, 326, 327, 373, 345 C, 345 G, 375, 378, 350, 257; 340/661

[56] References Cited

U.S. PATENT DOCUMENTS

| 3,569,809 | 3/1971 | Comer | 318/350 X |
|---|---|---|---|
| 3,753,065 | 8/1973 | Chiles | 318/73 |
| 3,872,362 | 3/1975 | Lecoeuche et al. | 318/341 X |
| 3,938,015 | 2/1976 | Beebe | 318/341 X |
| 3,947,753 | 3/1976 | Gushima | 340/661 X |
| 4,027,214 | 5/1977 | Klimo | 318/139 |
| 4,187,436 | 2/1980 | Etienne | 318/139 X |
| 4,260,938 | 4/1981 | Joyes | 318/139 X |

FOREIGN PATENT DOCUMENTS

| 2509862 | 11/1975 | Fed. Rep. of Germany | 318/139 |
|---|---|---|---|
| 2252685 | 6/1975 | France | 318/139 |

OTHER PUBLICATIONS

Conference: Electric Vehicle Development Group Third International Conference Resources for Electric Vehicles and their Infrastucture, London, England (Nov. 1979).

Primary Examiner—G. Z. Rubinson
Assistant Examiner—Paul Shik Luen Ip
Attorney, Agent, or Firm—Kenyon & Kenyon

[57] ABSTRACT

In an electric drive for a DC shunt propulsion motor which is supplied from a battery, the armature winding is connected to the battery, and the field winding is connected to the battery via an electronic DC control element. The electronic DC control element is associated with the field winding and also serves as a control element for charging the battery. The DC control element is further equipped with a voltage control device in addition to a current control device. A multiposition switch is arranged so that when the switch is in one position the field winding is connected via the electronic DC control element to the battery, and when the switch is in another position, the electronic DC control element is shunted across the battery.

2 Claims, 1 Drawing Figure

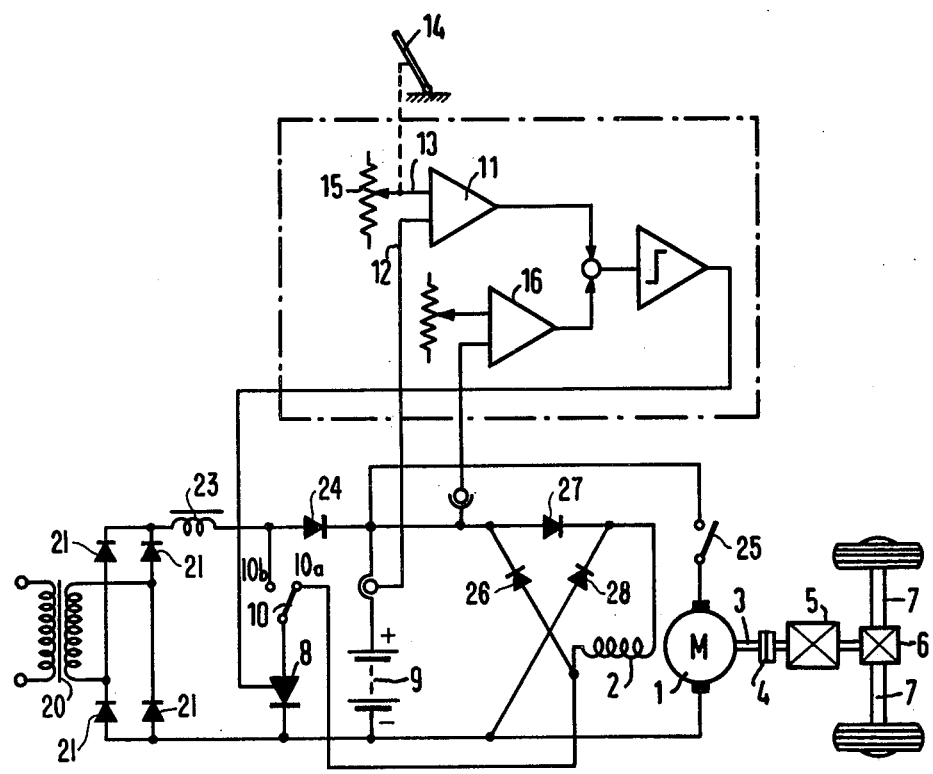

DC SHUNT TRACTION MOTOR DRIVE SUPPLIED FROM AN ENERGY ACCUMULATOR

BACKGROUND OF THE INVENTION

This invention relates generally to electric motor drive arrangements, and more particularly to a DC shunt propulsion motor which is supplied from an electrical energy accumulator, illustratively a battery, wherein the armature of the motor is connected to the energy accumulator, and the field winding of the motor is connected to the energy accumulator via an electronic DC control element having a current control device for controlling the speed of the motor. A transmission having a variable reduction ratio is interposed between the motor and a drive axle.

DC shunt traction motors which receive electrical energy from an energy accumulator, such as a battery, are known and used in vehicles. In addition to drive control apparatus, there must further be provided a charging device which is either stationary or on the vehicle. The advantage of utilizing existing electrical infrastructure, such as 16 ampere outlets of a 220 volt supply network, is best achieved if the charging device is arranged on the vehicle.

An electric drive having a DC shunt traction motor supplied from a battery is described in German Reference DE-OS No. 24 12 416. In this known arrangement, the speed of the motor can be controlled by means of an electronic DC control element which operates as a chopper. The traction motor is provided with an armature winding which is connected to the battery in an essentially direct manner. Speed is controlled only via the field winding of the traction motor, which is connected to the battery via the electronic DC control element. The DC control element is provided with a current controller having an actual-value input which receives a signal proportional to the armature current. At a reference input of the current controller is provided a signal proportional to the excursion of a foot pedal. A transmission having variable reduction gear ratio is interposed between the output shaft of the motor and the drive shaft of the electric drive arrangement.

The use of a DC control element, such as a chopper, arranged in the armature circuit for charging the battery is known from German Reference DE-OS No. 27 02 276. In this further known arrangement, a controller sets the motor current simultaneously with the charging current, and is associated with the DC control element. In this known arrangement, however, a targeted division of the total current into a predetermined motor current and a desired battery charging current is not possible. If the motor is switched off, only current control is provided for the charging of the battery, thereby permitting overcharging and gassing of the battery.

It is, therefore, an object of this invention to provide a DC control element for controlling the charging of the energy source in addition to, but independently of, the speed control.

SUMMARY OF THE INVENTION

The foregoing and other objects are achieved by this invention which provides a control element which is associated with the field winding of the motor and which simultaneously serves as a control element for charging the energy storage device. The DC control element is provided with a voltage control device, in addition to a current control device, and a multiposition switch is provided whereby when the switch is in a first position, the field winding is connected via the DC control element to the energy storage device, and when the switch is in a second position, the DC control element is shunted across the energy storage device.

The present invention achieves a considerable simplification of circuit structure over known arrangements because only a single DC control element is required for controlling the speed and for charging the battery in accordance with different charging characteristics. Moreover, this DC control element can be designed having a relatively low power rating such that a transistor has sufficient power handling capacity as the DC control element for relatively large drive powers, illustratively in the range of up to 150 kilowatts.

BRIEF DESCRIPTION OF THE DRAWING

Comprehension of the invention is facilitated by reading the following detailed description in conjunction with the annexed drawing which is a function block and schematic representation of a circuit arrangement constructed in accordance with the principles of the invention.

DETAILED DESCRIPTION

The FIGURE illustrates a circuit arrangement of an electric drive for an electric automobile. A motor having an armature 1 and a field winding 2 is of the DC shunt type and serves as the propulsion motor. The motor is provided with an output shaft 3 which is connected to a driving axle 7 of the vehicle via a clutch 4, a transmission 5 having variable reduction ratio, and a differential 6. The speed of the vehicle is controlled at field winding 2 which is connected via an electronic DC control element 8 to an energy storage device 9, which may be a battery, by means of a switch 10. Switch 10 is arranged such that when it is in a first position, field winding 2 is connected via DC control element 8 to energy storage device 9, and when the switch is in its other position, DC control element 8 is shunted across the energy storage device. In this manner, the DC control element can be used for controlling the speed of the vehicle as well as for charging the battery.

DC control element 8 is equipped with a current control device 11 having an actual-value input 12 which receives a signal proportional to the armature current. Current control device 11 is further provided with a reference-value input 13 which receives a signal which is proportional to the excursion of a foot pedal 14, or a signal which can be preset via a potentiometer 15.

A voltage control device 16 monitors the permissible voltages in travel/braking operations of the vehicle and in the charging of the energy storage device. The voltage control serves the following purposes:

a. Undervoltage limiting during motor operation,
b. Overvoltage limiting during braking operation,
c. Regulating a constant charging voltage during charging operation.

The control of the voltage is subordinated to the current control device 11 in such a manner that the currents are limited or reduced if the adjustable limits are reached.

Charging of battery 9 via a transformer 20, a rectifier bridge 21, a throttle 23, and a diode 24 is only undertaken while the vehicle is in the stationary condition. During such stationary charging, switch 10 is placed manually in position 10b, whereby DC control element 8 serves as a shunt regulating device. More specifically, electrical energy supplied by transformer 20 is rectified by rectifier diodes 21 so as to flow through a path including coil 23, diode 24, and battery 9. DC control element 8 is rendered conductive, as described hereinabove, to regulate the charging current and the charging voltage. Thus, when excessive charging current or voltage is detected, the charging current will bypass the battery via DC control element 8.

During operation of the vehicle, switch 10 is placed manually in position 10a, as shown, and a switch 25 is closed so as to connect motor armature 1 directly to battery 9. Field winding 2 is thus connected via DC control element 8 and a diode 27 to battery 9 so as to form a current path which includes the positive terminal of battery 9, diode 27, field winding 2, switch 10, DC control element 8, and the negative terminal of battery 9. If DC control element 8 is rendered nonconductive during speed control of the vehicle, the current flow in field winding 2 is maintained via a path including a free-running diode 26 and diode 27. Alternatively, field winding 2 may produce a voltage sufficient to regenerate battery 9 via diode 26, battery 9, a diode 28, and back to field winding 2.

Although the invention has been described in terms of specific embodiments and applications, persons skilled in the art, in light of this teaching, can generate additional embodiments without departing from the spirit or exceeding the scope of the claimed invention. Accordingly, it is to be understood that the drawing and description in this disclosure are proffered to facilitate comprehension of the invention and should not be construed to limit the scope thereof.

What is claimed is:

1. An electric drive arrangement for a vehicle, the electric drive arrangement being of the type having a DC shunt propulsion motor which is supplied electrical energy from an energy storage device, the DC shunt propulsion motor having an armature which is connected to the energy storage device and a field winding, an electronic DC control element connected to the energy storage device and to the field winding of the DC shunt propulsion motor for controlling the speed of the motor, and a transmission for providing a variable reduction ratio arranged intermediate of an output shaft of the DC shunt propulsion motor and a drive axle of the vehicle, the electric drive arrangement further comprising:

voltage control means having an input for receiving a signal responsive to a current flowing through the field winding and an output connected to the electronic DC control element whereby the electronic DC control element is adapted to control a charging current of the energy storage device; and switch means having at least first and second positions whereby when said switch means is in said first position the field winding is connected to the electronic DC control element and to the energy storage device, and when said switch means is in said second position, the electronic DC control element is shunted across the energy storage device.

2. An electric drive arrangement for a vehicle, the electric drive arrangement being the type having a DC propulsion motor which is controllable with respect to speed, an energy storage device, a DC control element electrically interposable between the DC propulsion motor and the energy storage device, and a control arrangement for controlling the conductive states of the DC control element in response to a current and a voltage, whereby the DC control element is connected in parallel to the energy storage device during a charging operation of the energy storage device, the arrangement further comprising:

an output shaft coupled to the DC propulsion motor;

a driving axle for conducting rotational motion to propel the vehicle;

a transmission having a selectably adjustable reduction ratio for coupling said output shaft to said driving axle;

switch means having first and second positions, whereby when said switch means is in said first position, a field winding of the DC propulsion motor is connected to the DC control element and to the energy storage device, and when said switch means is in said second position, the DC control element is shunted across the energy storage device; and current and voltage control means for controlling the conductive stages of the DC control element in response to current-responsive and voltage-responsive signals.

* * * * *